United States Patent
Sano et al.

(10) Patent No.: US 10,493,932 B2
(45) Date of Patent: Dec. 3, 2019

(54) COLLISION ENERGY ABSORBING DEVICE OF RAILCAR

(71) Applicant: KAWASAKI JUKOGYO KABUSHIKI KAISHA, Kobe-shi, Hyogo (JP)

(72) Inventors: Atsushi Sano, Kobe (JP); Naoaki Kawakami, Kobe (JP); Naohiro Yoshida, Kobe (JP); Shinichiro Hata, Kobe (JP); Seiichiro Yagi, Akashi (JP); Masayuki Tomizawa, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 27 days.

(21) Appl. No.: 15/580,411

(22) PCT Filed: Jun. 7, 2016

(86) PCT No.: PCT/JP2016/002743
§ 371 (c)(1),
(2) Date: Dec. 7, 2017

(87) PCT Pub. No.: WO2017/022158
PCT Pub. Date: Feb. 9, 2017

(65) Prior Publication Data
US 2018/0222417 A1    Aug. 9, 2018

(30) Foreign Application Priority Data

Aug. 4, 2015    (JP) ................................. 2015-154187

(51) Int. Cl.
B60R 19/34    (2006.01)
B61D 15/06    (2006.01)
(Continued)

(52) U.S. Cl.
CPC .............. *B60R 19/34* (2013.01); *B61D 15/06* (2013.01); *B61F 19/04* (2013.01); *B61G 11/16* (2013.01); *F16F 7/12* (2013.01)

(58) Field of Classification Search
CPC ......... B60R 19/34; B61D 15/06; B61F 19/04; B61G 11/16; F16F 7/12
(Continued)

(56) References Cited

U.S. PATENT DOCUMENTS 3,149,731 A * 9/1964 Dunlop .................. B61D 15/06
213/9
6,814,381 B1 * 11/2004 Frank ..................... B60R 19/34
293/120

(Continued)

FOREIGN PATENT DOCUMENTS

JP    2005-162061 A    6/2005
JP    2007-210441 A    8/2007
(Continued)

OTHER PUBLICATIONS

Sep. 6, 2016 International Search Report issued in International Patent Application No. PCT/JP2016/002743.

*Primary Examiner* — Joseph D. Pape
(74) *Attorney, Agent, or Firm* — Oliff PLC

(57) ABSTRACT

A collision energy absorbing device of a railcar includes: an outside plate constituting an outer tube including an axis extending in a car longitudinal direction; and at least one partition plate extending in the car longitudinal direction in an internal space surrounded by the outside plate, the at least one partition plate fixed to the outside plate and dividing the internal space. An outer shape of the outer tube is a shape that is symmetrical with respect to a virtual horizontal surface including the axis, and the at least one partition plate includes a missing portion in the internal space.

20 Claims, 10 Drawing Sheets

(51) Int. Cl.
*B61F 19/04* (2006.01)
*B61G 11/16* (2006.01)
*F16F 7/12* (2006.01)

(58) Field of Classification Search
USPC .......... 293/24, 38, 142, 132, 133; 105/392.5
See application file for complete search history.

(56) References Cited

U.S. PATENT DOCUMENTS

| | | | |
|---|---|---|---|
| 7,905,366 B2 * | 3/2011 | Jaede | B61D 15/06 105/392.5 |
| 2009/0001737 A1 * | 1/2009 | Salomonsson | B60R 19/34 293/133 |
| 2010/0126813 A1 | 5/2010 | Hayashi | |

FOREIGN PATENT DOCUMENTS

| | | |
|---|---|---|
| JP | 2010-83307 A | 4/2010 |
| JP | 2010-235030 A | 10/2010 |
| JP | 2015-30340 A | 2/2015 |

\* cited by examiner

COLLISION ENERGY ABSORBING DEVICE OF RAILCAR

TECHNICAL FIELD

The present invention relates to a collision energy absorbing device of a railcar.

BACKGROUND ART

A railcar may be provided with a collision energy absorbing device for easing an impact generated at the time of collision. To reduce reinforcing members of a carbody from the viewpoint of a reduction in weight of the carbody, a maximum load acting on the carbody needs to be reduced. Therefore, the collision energy absorbing device is required to reduce a peak load, generated at an initial stage of the collision, to reduce the maximum load at the time of the collision. An impact absorbing member disclosed in PTL 1 includes a quadrangular, tubular main body and a cross-shaped rib provided inside the main body along an axial direction of the main body and is produced by extrusion molding. A flat pressure receiving plate is provided at a front end of the impact absorbing member, and a cutout portion is partially formed at a rear end of the impact absorbing member. According to PTL 1, since the strength of the impact absorbing member is partially low in the vicinity of the cutout portion, a load peak value at the initial stage of the collision is reduced.

CITATION LIST

Patent Literature

PTL 1: Japanese Laid-Open Patent Application Publication No. 2005-162061

SUMMARY OF INVENTION

Technical Problem

However, when an obstacle collides with the pressure receiving plate, and the impact absorbing member starts buckling deformation, the main body is not tubular in the vicinity of the cutout portion, and the posture of the impact absorbing member at the time of deformation becomes unstable. Therefore, an energy absorbing efficiency may deteriorate. Further, when railcars collide with each other, and the impact absorbing member deforms in an unintended direction, a moment load is generated, and for example, float-up of the railcar tends to occur.

An object of the present invention is to stabilize the posture of a collision energy absorbing device at the time of deformation while absorbing desired collision energy and reducing a load peak value at an initial stage of collision.

Solution to Problem

A collision energy absorbing device of a railcar according to one aspect of the present invention includes: an outside plate constituting an outer tube having an axis extending in a car longitudinal direction; and at least one partition plate extending in the car longitudinal direction in an internal space surrounded by the outside plate, the at least one partition plate fixed to the outside plate and dividing the internal space, an outer shape of the outer tube being a shape that is symmetrical with respect to a virtual horizontal surface including the axis, and the at least one partition plate including a missing portion in the internal space.

According to the above configuration, the missing portion is formed at the partition plate in the internal space surrounded by the outside plate, and the outer shape of the outer tube is a shape that is symmetrical with respect to the virtual horizontal surface including the axis. Therefore, while absorbing desired collision energy and reducing a load peak value at an initial stage of collision, a moment load generated during crush of the collision energy absorbing device is suppressed, and the outside plate tends to crush with a stable posture at the time of the collision. When the outside plate constituting the outer tube crushes with a stable posture, the stable posture of the partition plate fixed to the outside plate is easily maintained. Therefore, the buckling deformation of the partition plate including the missing portion can be caused with a stable posture. The outside plate located away from the axis crushes with a stable posture, so that even when a load in a direction displaced from an axial direction is generated at the partition plate including the missing portion, a moment load generated at the collision energy absorbing device can be suppressed. This is because the missing portion is closer to the axis than the outside plate.

Advantageous Effects of Invention

According to the present invention, while absorbing the desired collision energy and reducing the load peak value at the initial stage of the collision, the posture of the collision energy absorbing device at the time of deformation can be stabilized.

DESCRIPTION OF EMBODIMENTS

Hereinafter, embodiments will be explained in reference to the drawings. In the following embodiments, a direction in which a railcar travels, in other words, a direction in which a carbody extends is referred to as a car longitudinal direction or a forward/rearward direction, and a lateral direction perpendicular to the car longitudinal direction is referred to as a car width direction or a leftward/rightward direction. The railcar can travel in both directions along the car longitudinal direction. However, in the following explanation, for convenience sake, a right direction in FIG. 1 is defined as a forward direction, and a left direction therein is defined as a rearward direction.

Embodiment 1

Figure 1:
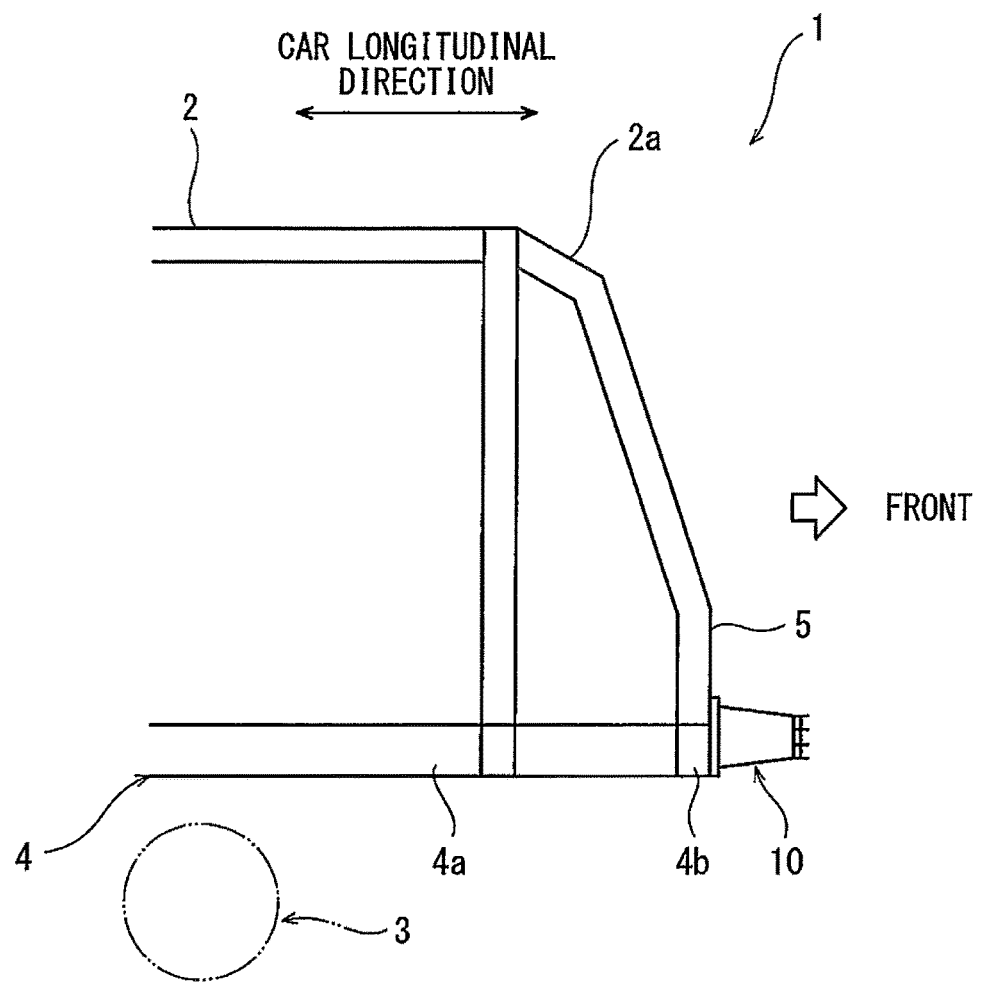
FIG. 1 is a side view of a head portion of a carbody of a railcar according to Embodiment 1.

FIG. 1 is a side view of a head portion 2a of a carbody 2 of a railcar 1 according to Embodiment 1. As shown in FIG. 1, the railcar 1 includes the carbody 2 and a bogie 3 supporting the carbody 2. A collision energy absorbing device 10 is fixed to a front portion of the head portion 2a of the carbody 2 so as to project forward. With this, when railcars traveling on the same railway track collide head-on with each other or when a railcar collides with an obstacle, the collision energy absorbing device 10 crushes by a load from a front side to absorb collision energy.

The carbody 2 includes an underframe 4. The underframe 4 includes a pair of side sills 4a and an end beam 4b. The pair of side sills 4a extend in the car longitudinal direction so as to be spaced apart from each other in the car width direction. The end beam 4b extends in the car width direction to couple front ends of the pair of side sills 4a to each other. A lower end portion of a post 5 extending upward from the end beam 4b is joined to the end beam 4b. The collision energy absorbing device 10 is fixed to a front surface of the end beam 4b and a front surface of the post 5 to project forward from the underframe 4.

Figure 2:
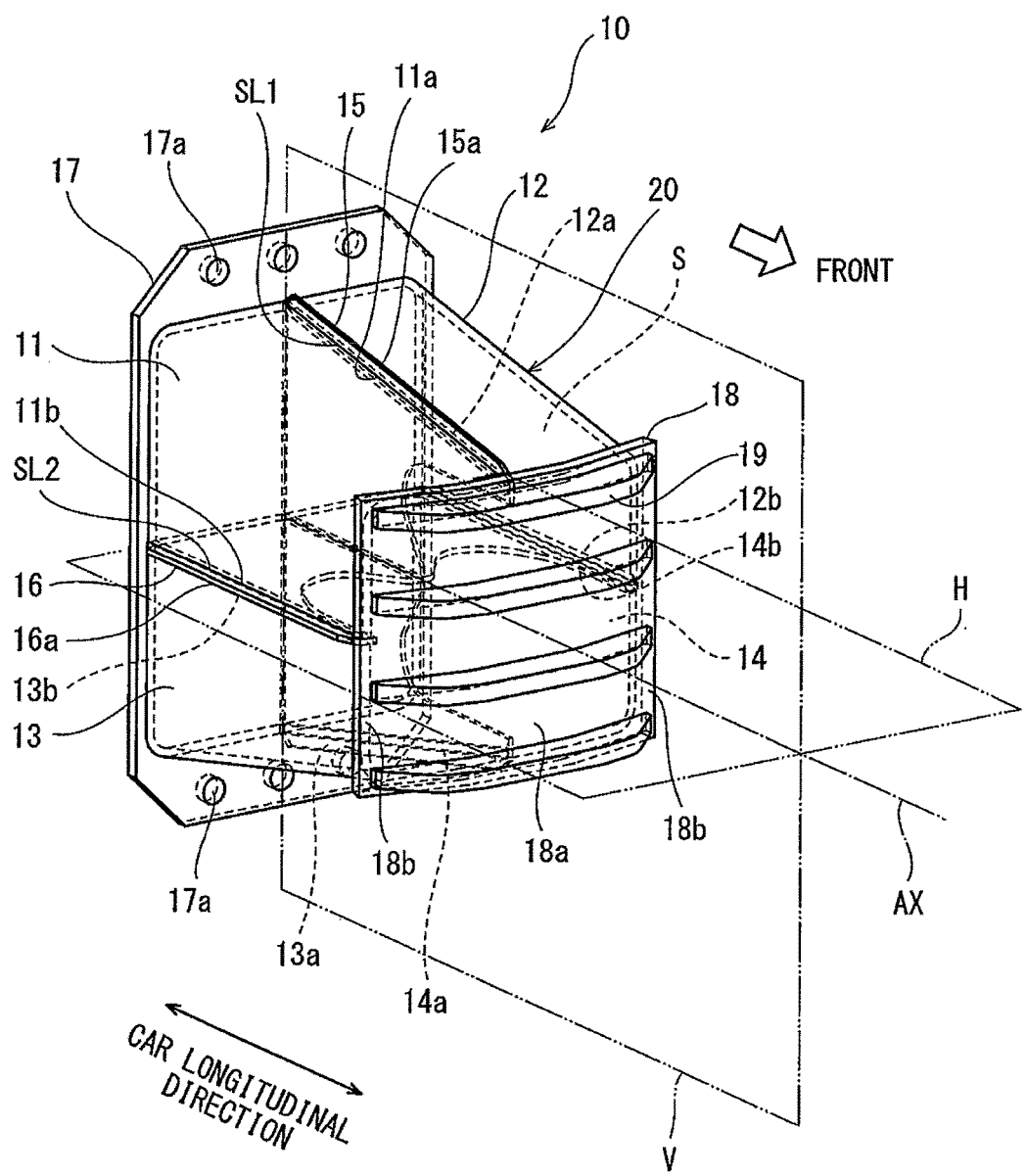
FIG. 2 is a perspective view of a collision energy absorbing device mounted on the carbody of FIG. 1.

FIG. 2 is a perspective view of the collision energy absorbing device 10 mounted on the carbody 2 of FIG. 1. As shown in FIG. 2, the collision energy absorbing device 10 includes a plurality of outside plates 11 to 14, a vertical partition plate 15, a horizontal partition plate 16, a rear plate 17, and a front plate 18. The plates 11 to 18 are made of, for example, metal. The plurality of outside plates 11 to 14 are combined with one another through the vertical partition plate 15 and the horizontal partition plate 16 to constitute an outer tube 20. An axis AX passing through the center of gravity of the outer tube 20 coincides with the car longitudinal direction. The outer tube 20 has an outer shape that is symmetrical with respect to a virtual vertical surface V including the axis AX and also symmetrical with respect to a virtual horizontal surface H including the axis AX. However, the outer tube 20 is not limited to this and may have an outer shape that is not symmetrical with respect to the virtual vertical surface V including the axis AX but symmetrical with respect to the virtual horizontal surface H including the axis AX. The outer tube 20 has such a tapered shape that a vertical cross section of the outer tube 20 which section includes the axis AX becomes small from a rear side toward the front side. A horizontal cross section of the outer tube 20 which section includes the axis AX has a rectangular shape. Further, a vertical cross section of the outer tube 20 which section is perpendicular to the axis AX has a quadrangular shape.

The plurality of outside plates 11 to 14 are obtained by dividing the outer tube 20 into a plurality of parts along parting lines extending in the car longitudinal direction. In the present embodiment, the number of outside plates 11 to 14 is four. The outside plates 11 to 14 are arranged so as to be symmetrical with respect to the virtual vertical surface V and also symmetrical with respect to the virtual horizontal surface H. In the present embodiment, the outside plates 11 to 14 are the same in shape as one another, and a vertical cross section of each of the outside plates 11 to 14 which section is perpendicular to the axis AX has an L shape. Slots SL1 and SL2 (gaps) are formed between opposing side end edges of the outside plates 11 to 14. Side end portions 15a of the vertical partition plate 15 are inserted into the slots SL1, the side end portions 15a being located outside in a direction perpendicular to the axis AX. With this, the side end portions 15a are sandwiched by the outside plates 11 to 14. Similarly, side end portions 16a of the horizontal partition plate 16 are inserted into the slots SL2, the side end portions 16a being located outside in a direction perpendicular to the axis AX. With this, the side end portions 16a are sandwiched by the outside plates 11 to 14.

The vertical partition plate 15 and the horizontal partition plate 16 extends in a direction along the axis AX in an internal space S surrounded by the outside plates 11 to 14. The vertical partition plate 15 and the horizontal partition plate 16 intersect with each other and fix the outside plates 11 to 14. The vertical partition plate 15 divides the internal space S into left and right parts, and the horizontal partition plate 16 divides the internal space S into upper and lower parts. The upper and lower side end portions 15a of the vertical partition plate 15 are located at the upper and lower slots SL1, respectively, the upper and lower slots SL1 being formed by the outside plates 11 to 14. The upper and lower side end portions 15a are sandwiched by side end edges 11a to 14a of the outside plates 11 to 14 in the leftward/rightward direction. The left and right side end portions 16a of the horizontal partition plate 16 are located at the respective slots SL2 formed by the outside plates 11 to 14. The left and right side end portions 16a are sandwiched by side end edges 11b to 14b of the outside plates 11 to 14 in an upward/downward direction. To be specific, the side end portions 15a of the vertical partition plate 15 and the side end portions 16a of the horizontal partition plate 16 partially constitute the outer tube 20. The side end portions 15a of the vertical partition plate 15 and the side end portions 16a of the horizontal partition plate 16 project outward beyond outer surfaces of the outside plates 11 to 14. However, the side end portions 15a of the vertical partition plate 15 and the side end portions 16a of the horizontal partition plate 16 are not limited to these and may not project outward beyond the outer surfaces of the outside plates 11 to 14. For example, the side end portions 15a of the vertical partition plate 15 and the side end portions 16a of the horizontal partition plate 16 may be flush with the outer surfaces of the outside plates 11 to 14. Further, the side end portions 15a of the vertical partition plate 15 and the side end portions 16a of the horizontal partition plate 16 may be arranged inside the outer surfaces of the outside plates 11 to 14. Even in this case, the upper and lower side end portions 15a of the vertical partition plate 15 are only required to be sandwiched by the side end edges 11a to 14a of the outside plates 11 to 14 in the leftward/rightward direction.

The rear plate 17 faces a rear end of the outer tube 20 and liquidtightly closes an opening of the rear end of the outer tube 20. The rear plate 17 is larger than an outer shape of the rear end of the outer tube 20. Fastening holes 17a are formed on a portion of the rear plate 17, the portion being located outside beyond the rear end of the outer tube 20 in a direction perpendicular to the axis AX. To be specific, the collision energy absorbing device 10 is fixed to the carbody 2 by fastening members (such as bolts or rivets) inserted into the fastening holes 17a of the rear plate 17. It should be noted that the rear plate 17 may be fixed to the carbody 2 by welding.

The front plate 18 faces a front end of the outer tube 20 and liquidtightly closes an opening of the front end of the outer tube 20. The front plate 18 is larger than an outer shape of the front end of the outer tube 20. The front plate 18 has such a shape that a car width direction middle portion 18a thereof projects forward beyond both car width direction end portions 18b thereof (also see FIG. 4). Specifically, a horizontal cross section of the front plate 18 has a shape that is convex toward the front side. A vertical cross section of the front plate 18 has a shape that extends linearly in the vertical direction. A plurality of plate-shaped anti-climbers 19 are fixed to a front surface of the front plate 18 so as to be spaced apart from one another in the vertical direction and extend in the car width direction. The internal space S of the collision energy absorbing device 10 is a closed space closed by the outer tube 20, the rear plate 17, and the front plate 18.

Figure 3:
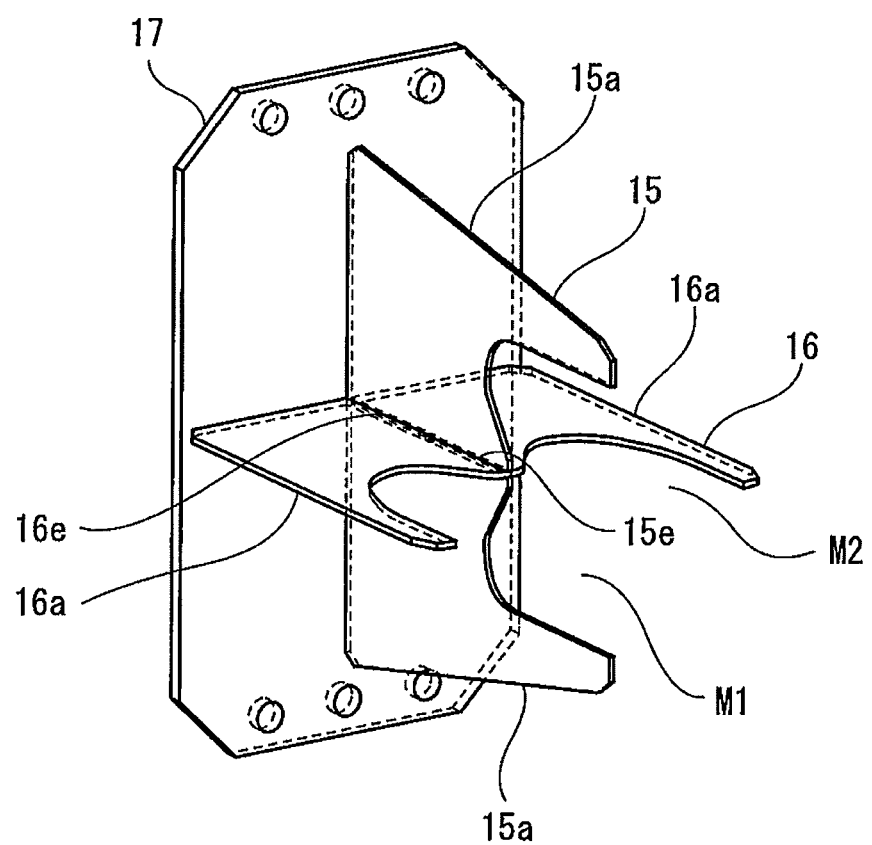
FIG. 3 is a perspective view showing a state where outside plates and a front plate are removed from the collision energy absorbing device of FIG. 2.
Figure 4A:
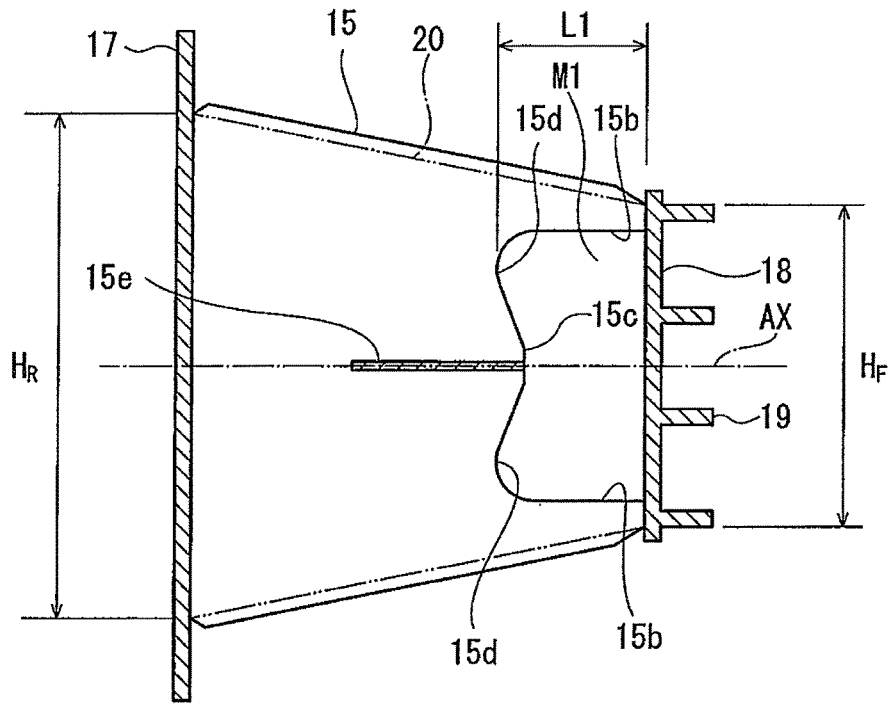
FIG. 4A is a vertical cross-sectional view of the collision energy absorbing device of FIG. 2 and is a diagram in which an outer tube is shown by virtual lines.
Figure 4B:
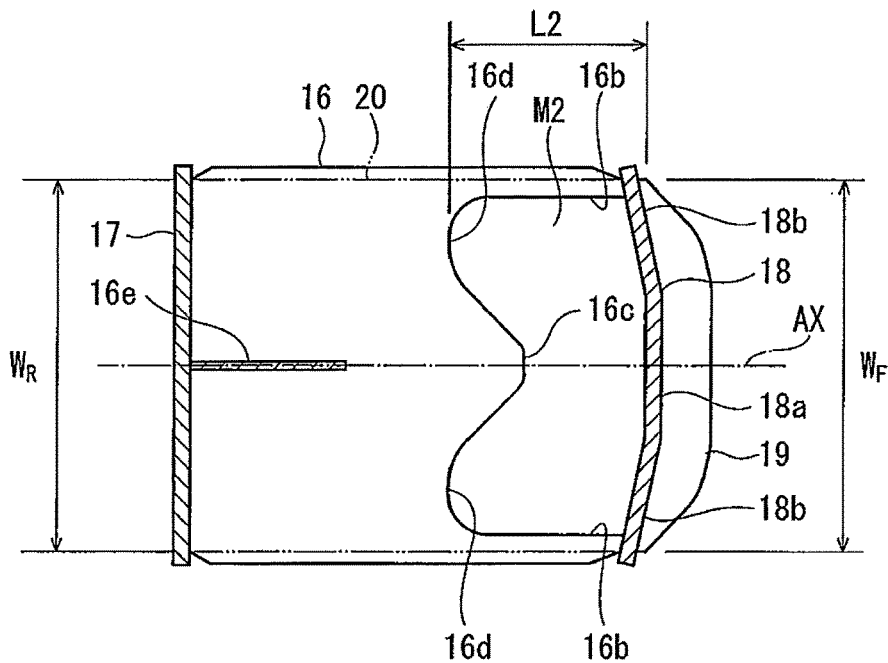
FIG. 4B is a horizontal cross-sectional view of the collision energy absorbing device of FIG. 2.

FIG. 3 is a perspective view showing a state where the outside plates 11 to 14 and the front plate 18 are removed from the collision energy absorbing device 10 of FIG. 2. FIG. 4A is a vertical cross-sectional view of the collision energy absorbing device 10 of FIG. 2 and is a diagram in which the outer tube 20 is shown by virtual lines. FIG. 4B is a horizontal cross-sectional view of the collision energy absorbing device 10 of FIG. 2. As shown in FIGS. 4A and 4B, the rear end of the outer tube 20 has a vertically long shape, and the front end of the outer tube 20 has a horizontally long shape. To be specific, a height HR of the rear end of the outer tube 20 is larger than a width WR of the rear end of the outer tube 20, and a height HF of the front end of the outer tube 20 is smaller than a width WF of the front end of the outer tube 20. In other words, a vertical length of the rear end of the outer tube 20 is larger than a horizontal length of the rear end of the outer tube 20, and a vertical length of the front end of the outer tube 20 is smaller than a horizontal length of the front end of the outer tube 20. A height of a rear end of the vertical partition plate 15 is larger than a width of a rear end of the horizontal partition plate 16, and a height of a front end of the vertical partition plate 15 is smaller than a width of a front end of the horizontal partition plate 16.

As shown in FIGS. 3 and 4A, the pair of side end portions 15a of the vertical partition plate 15 are inclined so as to get close to each other as they extend from the rear side to the front side. The vertical partition plate 15 includes a missing portion M1 in the internal space S surrounded by the outside plates 11 to 14. The missing portion M1 is a cut portion provided at the vertical partition plate 15 such that an area of the vertical partition plate 15 becomes smaller than an area of a region of a virtual flat surface including the vertical partition plate 15, the region being defined by a front surface of the rear plate 17, an inner surface of the outer tube 20, and a rear surface of the front plate 18. In the present embodiment, the missing portion M1 is formed by cutting out a front portion of the vertical partition plate 15 such that the front end of the vertical partition plate 15 is depressed rearward. To be specific, the missing portion M1 is formed at a car longitudinal direction front end portion of the vertical partition plate 15.

The missing portion M1 has such a shape that an area of a cross section of the vertical partition plate 15 which section is perpendicular to the axis AX gradually increases as a cutting position of the cross section of the vertical partition plate 15 goes from the front side to the rear side. The front end portion of the vertical partition plate 15 includes a plurality of convex portions 15b and 15c having respective projection amounts that are different from each other. Specifically, the front end of the vertical partition plate 15 is formed in a W shape. To be specific, the front end portion of the vertical partition plate 15 includes: side convex portions 15b located at both respective sides in the vertical direction and projecting forward; a middle convex portion 15c located at a middle in the vertical direction and projecting forward; and concave portions 15d each located between the side convex portion 15b and the middle convex portion 15c and depressed rearward. The missing portion M1 is formed by: outer edges of the side convex portions 15b which edges are located close to the axis AX; an outer edge of the middle convex portion 15c; and outer edges of the concave portions 15d.

The projection amount of the middle convex portion 15c in the forward direction is smaller than the projection amount of the side convex portion 15b in the forward direction. To be specific, a front end of the middle convex portion 15c is located behind a front end of the side convex portion 15b. Each of the side convex portions 15b and the middle convex portion 15c has such a shape that an area of a cross section perpendicular to the axis AX increases as a cutting position of the cross section goes to the rear side. The side convex portions 15b contact the front plate 18. The side convex portion 15b is arranged at a position where the vertical partition plate 15 and any one of the outside plates 11 to 14 intersect with each other. The middle convex portion 15c is arranged at a position where the vertical partition plate 15 and the horizontal partition plate 16 intersect with each other. An opposing slit 15e is formed at a vertically middle of the vertical partition plate 15. The opposing slit 15e extends rearward from the front end of the vertical partition plate 15 and terminates at an intermediate position between the front and rear ends of the vertical partition plate 15.

As shown in FIGS. 3 and 4B, the pair of side end portions 16a of the horizontal partition plate 16 are substantially parallel to each other. The horizontal partition plate 16 includes a missing portion M2 in the internal space S surrounded by the outside plates 11 to 14. The missing portion M2 is a cut portion provided at the horizontal partition plate 16 such that an area of the horizontal partition plate 16 becomes smaller than an area of a region of a virtual flat surface including the horizontal partition plate 16, the region being defined by the front surface of the rear plate 17, the inner surface of the outer tube 20, and the rear surface of the front plate 18. In the present embodiment, the missing portion M2 is formed by cutting out a front portion of the horizontal partition plate 16 such that the front end of the horizontal partition plate 16 is depressed rearward. To be specific, the missing portion M2 is formed at a car longitudinal direction front end portion of the horizontal partition plate 16.

The missing portion M2 has such a shape that an area of a cross section of the horizontal partition plate 16 which section is perpendicular to the axis AX gradually increases as a cutting position of the cross section of the horizontal partition plate 16 goes from the front side to the rear side. The front end portion of the horizontal partition plate 16 includes a plurality of convex portions 16b and 16c having respective projection amounts that are different from each other. Specifically, the front end of the horizontal partition plate 16 is formed in a W shape. To be specific, the front end portion of the horizontal partition plate 16 includes: side convex portions 16b located at both respective sides in the horizontal direction and projecting forward; a middle convex portion 16c located at a middle in the horizontal direction and projecting forward; and concave portions 16d each located between the side convex portion 16b and the middle convex portion 16c and depressed rearward. The missing portion M2 is formed by: outer edges of the side convex portions 16b which edges are located close to the axis AX; an outer edge of the middle convex portion 16c; and outer edges of the concave portions 16d.

The projection amount of the middle convex portion 16c in the forward direction is smaller than the projection amount of the side convex portion 16b in the forward direction. To be specific, a front end of the middle convex portion 16c is located behind a front end of the side convex portion 16b. The middle convex portion 16c has such a shape that an area of a cross section perpendicular to the axis AX increases as a cutting position of the cross section goes to the rear side. In the direction along the axis AX, the front end of the middle convex portion 16c is the same in position as the front end of the middle convex portion 15c. A depression amount of the concave portion 16d in the rearward direction is larger than a depression amount of the concave portion 15d in the rearward direction. To be specific, a rearmost end of the missing portion M2 is located behind a rearmost end of the missing portion M1. With this, a car longitudinal direction length L1 of the missing portion M1 of the vertical partition plate 15 and a car longitudinal direction length L2 of the missing portion M2 of the horizontal partition plate 16 are different from each other. The side convex portions 16b contact the front plate 18. The side convex portion 16b is arranged at a position where the horizontal partition plate 16 and any one of the outside plates 11 to 14 intersect with each other. The middle convex portion 16c is arranged at a position where the vertical partition plate 15 and the horizontal partition plate 16 intersect with each other.

An opposing slit 16e is formed at a horizontally middle of the horizontal partition plate 16. The opposing slit 16e extends forward from the rear end of the horizontal partition plate 16 and terminates at an intermediate position between the rear and front ends of the horizontal partition plate 16. The opposing slit 15e and the opposing slit 16e are fitted to each other, so that the vertical partition plate 15 and the horizontal partition plate 16 are positioned so as to intersect with each other. At this intersecting portion, the vertical partition plate 15 and the horizontal partition plate 16 are joined to each other by welding. Each of the missing portions M1 and M2 has a shape that is symmetrical with respect to the virtual vertical surface V including the axis AX and also symmetrical with respect to the virtual horizontal surface H including the axis AX (see FIG. 2). However, each of the missing portions M1 and M2 is not limited to this and may have a shape that is symmetrical with respect to the virtual vertical surface V including the axis AX or symmetrical with respect to the virtual horizontal surface H including the axis AX.

Figure 5:
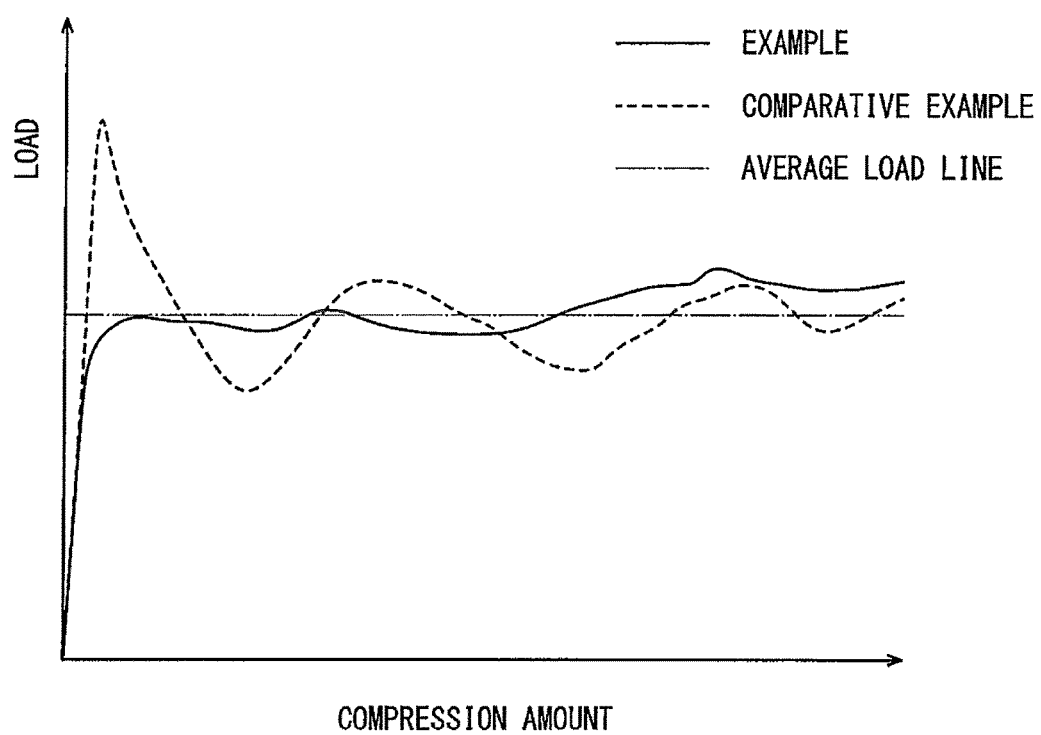
FIG. 5 is a graph showing a relation between an axial compression amount and a load when the collision energy absorbing device of FIG. 2 crushes.

FIG. 5 is a graph showing a relation between an axial compression amount and a load when the collision energy absorbing device 10 of FIG. 2 crushes. In the graph of FIG. 5, a solid line shows a load characteristic of the collision energy absorbing device 10 of Embodiment 1 (Example), a broken line shows a load characteristic of a collision energy absorbing device configured such that a partition plate does not include a missing portion (Comparative Example), and a one-dot chain line shows an average load line. As shown in FIG. 5, when an obstacle collides with the collision energy absorbing device 10, the obstacle contacts the front plate 18 at an initial stage of the collision. Since the partition plates 15 and 16 include the missing portions M1 and M2, an initial load peak value is suppressed low. Next, as buckling deformations of the outside plates 11 to 14 and the side convex portions 15b and 16b of the partition plates 15 and 16 proceed, the load starts decreasing. When the front plate 18 contacts the middle convex portions 15c and 16c, the decrease in the load is suppressed. After that, as the crush proceeds, the cross-sectional areas of the partition plates 15 and 16 for the buckling deformation gradually increase. Thus, the collision energy is absorbed while maintaining the suppression of the load fluctuation. As above, in Example as compared to Comparative Example, the load peak value at the initial stage of the collision is suppressed. Further, a deviation of a local maximum value of the load from the average load line and a deviation of a local minimum value of the load from the average load line are small, and a collision energy absorbing efficiency is high.

According to the configuration explained as above, the missing portions M1 and M2 are formed at the vertical partition plate 15 and the horizontal partition plate 16 in the internal space S surrounded by the outside plates 11 to 14, and the outer shape of the outer tube 20 is a shape that is symmetrical in the vertical direction and the horizontal direction. Therefore, the outside plates 11 to 14 tend to crush with stable postures at the time of the collision. When the outside plates 11 to 14 constituting the outer tube 20 crush with stable postures, the stable postures of the vertical partition plate 15 and the horizontal partition plate 16 fixed to the outside plates 11 to 14 are also maintained Therefore, the buckling deformations of the vertical and horizontal partition plates 15 and 16 including the missing portions M1 and M2 can be caused with stable postures. The outside plates 11 to 14 located away from the axis AX crush with stable postures, so that even when a load in a direction displaced from an axial direction is generated at the vertical and horizontal partition plates 15 and 16 including the missing portions M1 and M2, a moment load in a pitching direction and a moment load in a yaw direction generated during the crush of the collision energy absorbing device 10 can be suppressed. This is because the missing portions M1 and M2 are closer to the axis AX than the outside plates 11 to 14. Further, since the rear end of the outer tube 20 has a vertically long shape, and the front end of the outer tube 20 has a horizontally long shape, the moment load in the pitching direction and the moment load in the yaw direction can be suppressed in a balanced manner.

Each of the missing portions M1 and M2 has such a shape that the area of the cross section of the partition plate 15 or 16 which section is perpendicular to the axis AX gradually increases as the cutting position of the cross section of the partition plate 15 or 16 goes from the front side to the rear side. Therefore, the load fluctuation due to a stroke is suppressed, and a collision energy absorbing ability improves. Since the car longitudinal direction length L1 of the missing portion M1 of the vertical partition plate 15 and the car longitudinal direction length L2 of the missing portion M2 of the horizontal partition plate 16 are different from each other, the load fluctuation during the crush of the collision energy absorbing device 10 can be further suppressed. Since each of the missing portions M1 and M2 has a shape that is symmetrical with respect to the virtual vertical surface V including the axis AX and also symmetrical with respect to the virtual horizontal surface H including the axis AX, the stabilization of crush postures of the partition plates 15 and 16 can be promoted. Since each of the middle convex portions 15c and 16c is arranged at the position where the vertical partition plate 15 and the horizontal partition plate 16 intersect with each other, the impact generated at the middle convex portions 15c and 16c is three-dimensionally received at a portion where the vertical partition plate 15 and the horizontal partition plate 16 intersect with each other, and this can promote the appropriate buckling deformation.

Since the front plate 18 has such a shape that the car width direction middle portion 18a projects forward beyond the car width direction end portions 18b, the peak load at the initial stage of the collision can be further reduced. Since the rear plate 17 closes the opening of the rear end of the outer tube 20, and the front plate 18 closes the opening of the front end of the outer tube 20, the design of the appearance of the collision energy absorbing device 10 improves. Since the rear plate 17 and the front plate 18 are liquidtightly joined to the outer tube 20, rain water hardly enters into the internal space S, and this can prevent the generation of rust.

Embodiment 2

Figure 6:
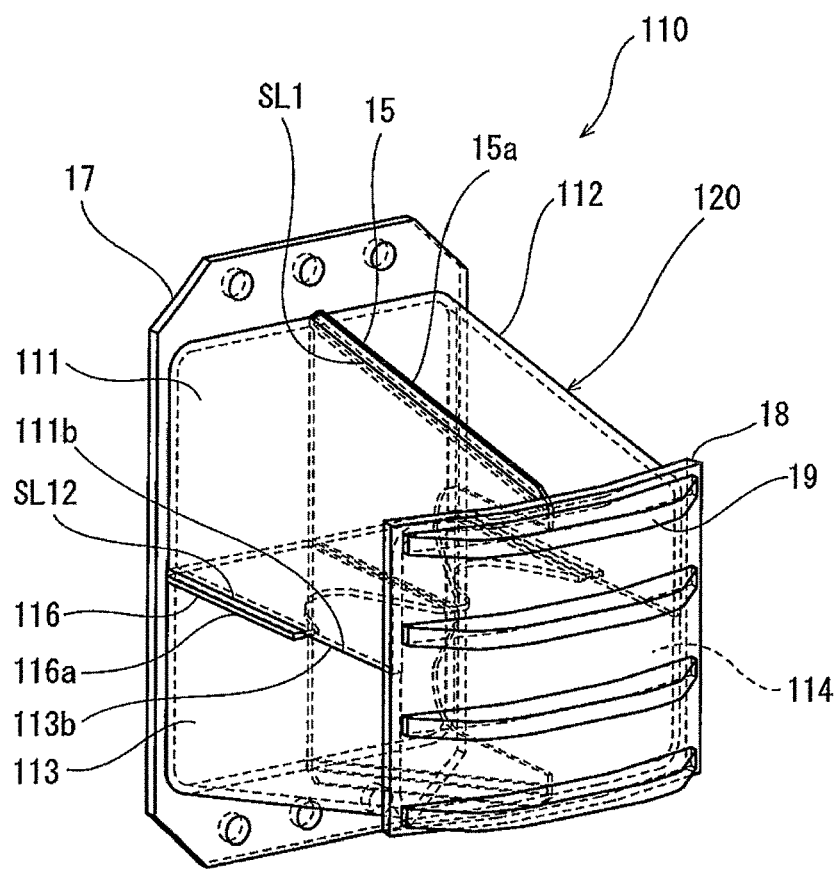
FIG. 6 is a perspective view of the collision energy absorbing device according to Embodiment 2.
Figure 7:
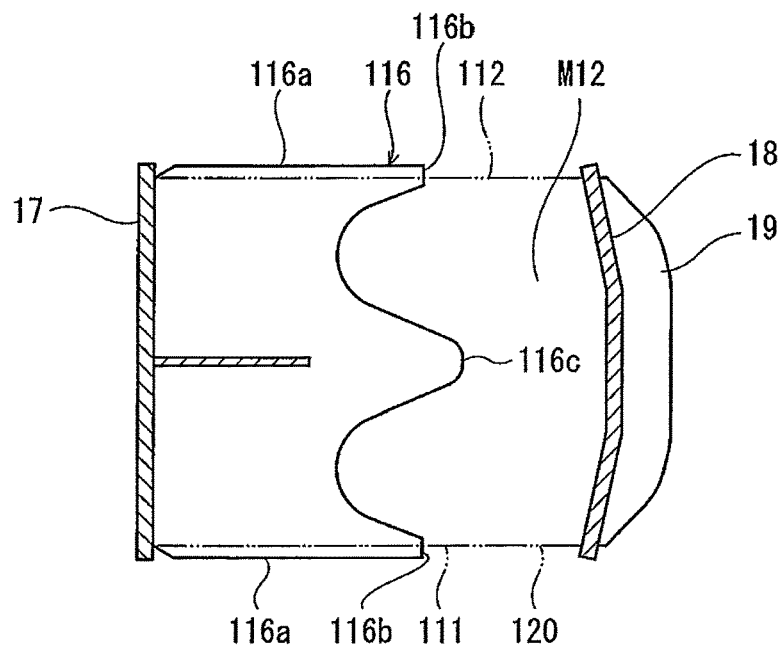
FIG. 7 is a horizontal cross-sectional view of the collision energy absorbing device of FIG. 6 and is a diagram in which the outer tube is shown by virtual lines.

FIG. 6 is a perspective view of a collision energy absorbing device 110 according to Embodiment 2. FIG. 7 is a horizontal cross-sectional view of the collision energy absorbing device 110 of FIG. 6 and is a diagram in which an outer tube 120 is shown by virtual lines. As shown in FIGS. 6 and 7, in the collision energy absorbing device 110 of Embodiment 2, a plurality of outside plates 111 to 114 are combined with one another through the vertical partition plate 15 and a horizontal partition plate 116 to constitute the outer tube 120. Side end portions 116a of the horizontal partition plate 116 are separated rearward from front ends of the outside plates 111 to 114 and the front plate 18. To be specific, the entire horizontal partition plate 116 is separated rearward from the front plate 18, and a missing portion M12 is formed between the horizontal partition plate 116 and the front plate 18. Therefore, left and right slots SL12 formed by the outside plates 111 to 114 are separated rearward from the front ends of the outside plates 111 to 114.

A front end of the horizontal partition plate 116 is formed in a W shape. The projection amount of a side convex portion 116b of the horizontal partition plate 116 in the forward direction is smaller than the projection amount of a middle convex portion 116c of the horizontal partition plate 116 in the forward direction. Front ends of the side convex portions 116b are located behind a front end of the middle convex portion 116c. To be specific, the front ends of the side convex portions 116b of the horizontal partition plate 116 are different in position in the car longitudinal direction from the convex portions 15b and 15c (see FIG. 4A) of the vertical partition plate 15. According to this configuration, the load peak value at the initial stage of the collision can be further reduced, and the load fluctuation during the crush of the collision energy absorbing device 110 can be suitably suppressed. It should be noted that the entire horizontal partition plate 116 may be separated forward from the rear plate 17, and a missing portion may be formed between the horizontal partition plate 116 and the rear plate 17. Further, instead of the horizontal partition plate 116, the entire vertical partition plate 15 may be separated from the rear plate 17 or the front plate 18.

Embodiment 3

Figure 8A:
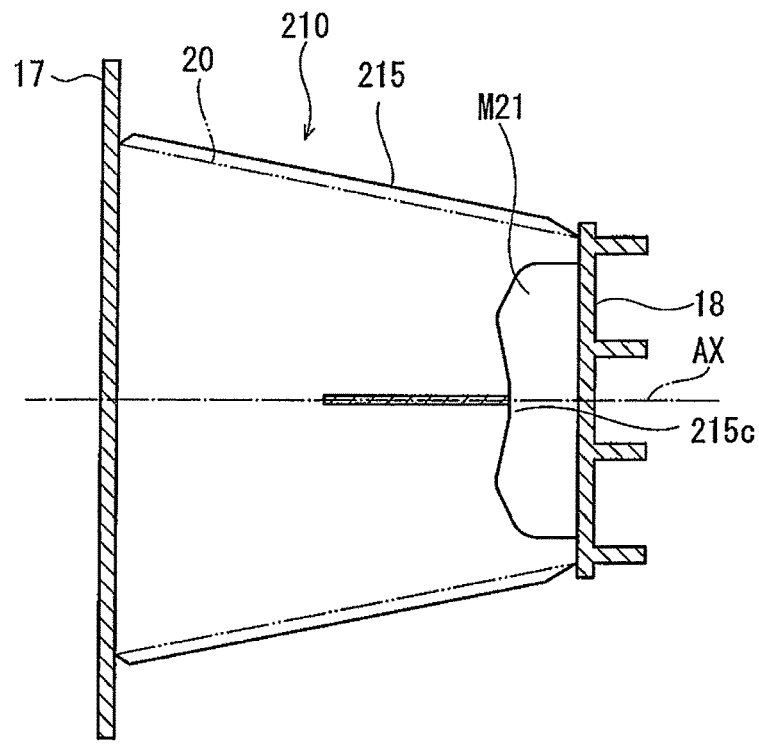
FIG. 8A is a vertical cross-sectional view of the collision energy absorbing device according to Embodiment 3 and is a diagram in which the outer tube is shown by virtual lines.
Figure 8B:
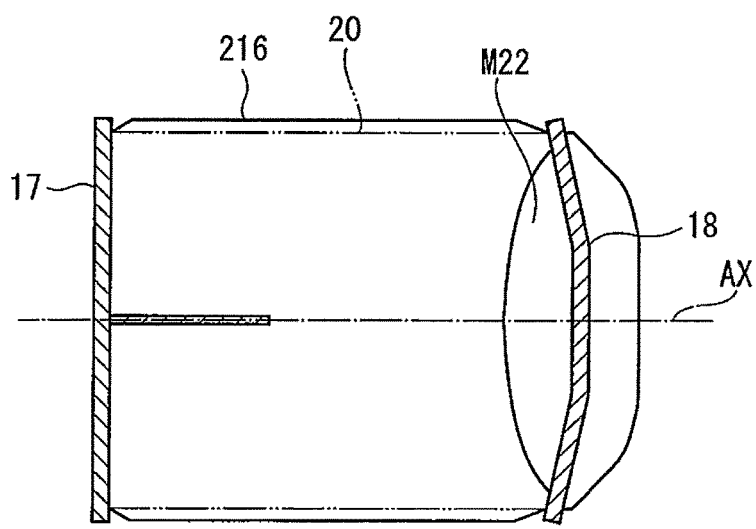
FIG. 8B is a horizontal cross-sectional view of the collision energy absorbing device according to Embodiment 3.

FIG. 8A is a vertical cross-sectional view of a collision energy absorbing device 210 according to Embodiment 3 and is a diagram in which the outer tube 20 is shown by virtual lines. FIG. 8B is a horizontal cross-sectional view of the collision energy absorbing device 210. As shown in FIGS. 8A and 8B, in the collision energy absorbing device 210 of Embodiment 3, a missing portion M21 is formed by cutting out a front portion of a vertical partition plate 215 such that a front end of the vertical partition plate 215 has a W shape, and a missing portion M22 is formed by cutting out a front portion of a horizontal partition plate 216 such that a front end of the horizontal partition plate 216 has a U shape. A rearmost end of the missing portion M21 is located behind a rearmost end of the missing portion M22. A middle convex portion 215c of the vertical partition plate 215 is arranged at a position where the vertical partition plate 215 and the horizontal partition plate 216 intersect with each other. At the position where the vertical partition plate 215 and the horizontal partition plate 216 intersect with each other, a front end of the vertical partition plate 215 and a front end of the horizontal partition plate 216 are the same in position as each other in the direction along the axis AX. According to this configuration, the load peak value at the initial stage of the collision can be further reduced, and the collision energy absorbing ability can be improved.

Embodiment 4

Figure 9A:
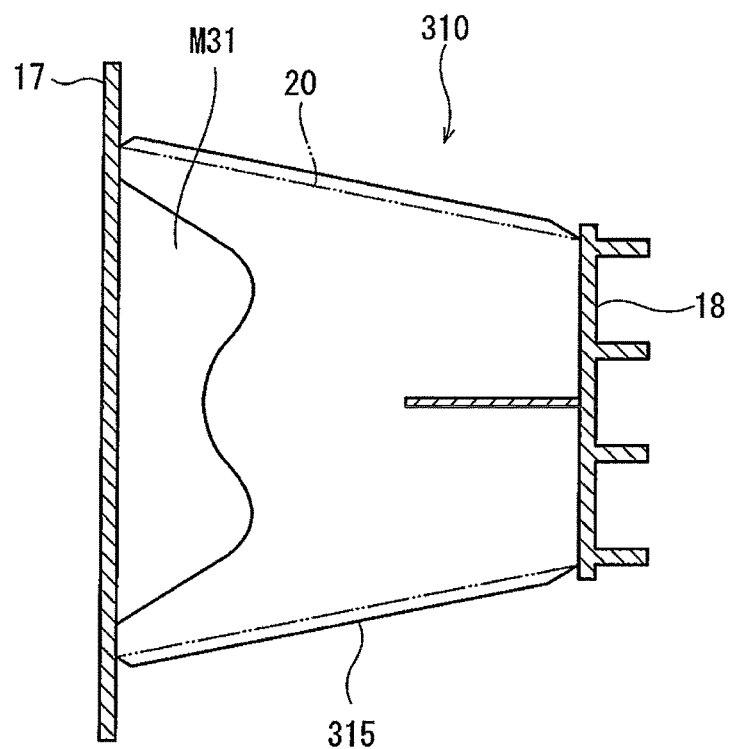
FIG. 9A is a vertical cross-sectional view of the collision energy absorbing device according to Embodiment 4 and is a diagram in which the outer tube is shown by virtual lines.
Figure 9B:
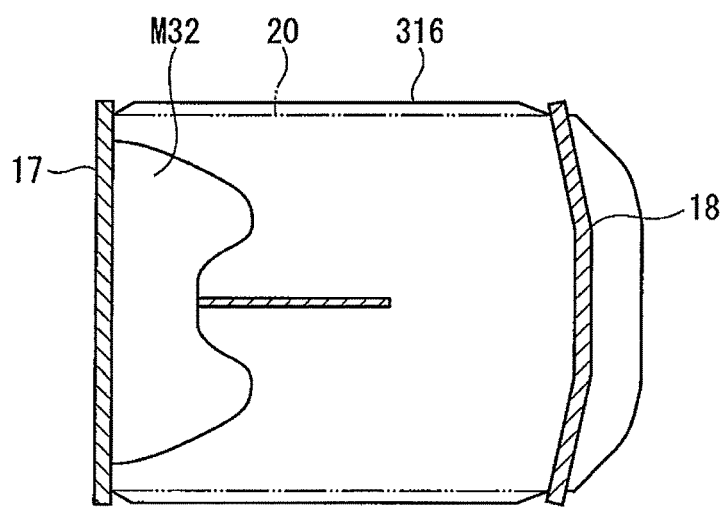
FIG. 9B is a horizontal cross-sectional view of the collision energy absorbing device according to Embodiment 4.

FIG. 9A is a vertical cross-sectional view of a collision energy absorbing device 310 according to Embodiment 4 and is a diagram in which the outer tube 20 is shown by virtual lines. FIG. 9B is a horizontal cross-sectional view of the collision energy absorbing device 310. As shown in FIGS. 9A and 9B, in the collision energy absorbing device 310 of Embodiment 4, a missing portion M31 is provided at a rear side of a vertical partition plate 315, and a missing portion M32 is provided at a rear side of a horizontal partition plate 316. Each of the missing portions M31 and M32 has such a shape that an area of a cross section of the vertical or horizontal partition plate 315 or 316 which section is perpendicular to the axis AX gradually decreases as a cutting position of the cross section of the vertical or horizontal partition plate 315 or 316 goes from the front side to the rear side. The missing portion M31 is formed by cutting out a rear portion of the vertical partition plate 315 such that a rear end of the vertical partition plate 315 has a W shape, and the missing portion M32 is formed by cutting out a rear portion of the horizontal partition plate 316 such that a rear end of the horizontal partition plate 316 has a W shape. According to this configuration, the buckling deformation of a rear end portion of the outer tube 20 is caused at the initial stage of the collision, and a contact range of the outer tube 20 with the rear plate 17 increases. Therefore, the posture of the collision energy absorbing device 310 easily stabilizes from the initial stage of the collision.

Embodiment 5

Figure 10A:
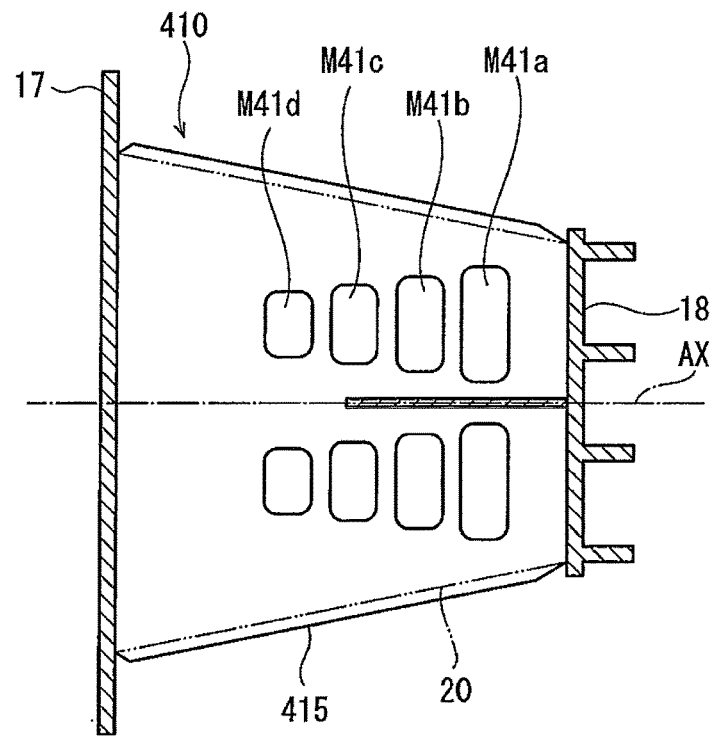
FIG. 10A is a vertical cross-sectional view of the collision energy absorbing device according to Embodiment 5 and is a diagram in which the outer tube is shown by virtual lines.
Figure 10B:
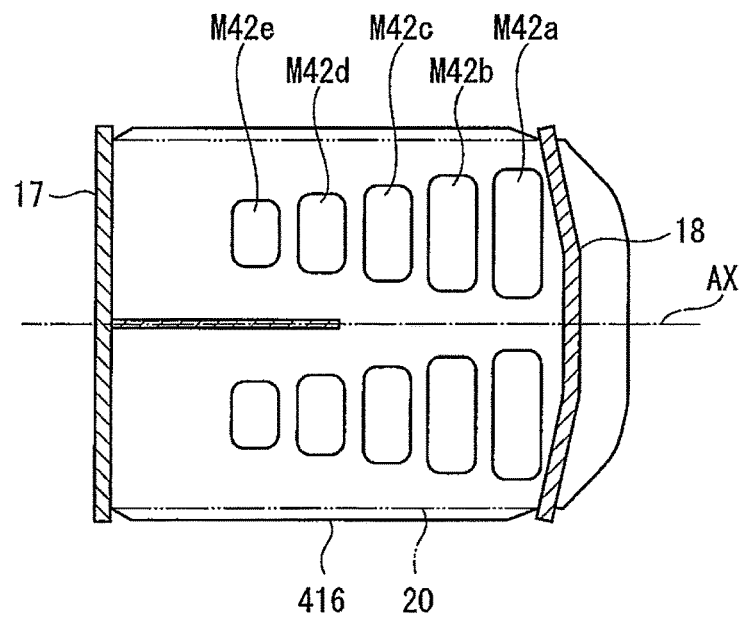
FIG. 10B is a horizontal cross-sectional view of the collision energy absorbing device according to Embodiment 5.

FIG. 10A is a vertical cross-sectional view of a collision energy absorbing device 410 according to Embodiment 5 and is a diagram in which the outer tube 20 is shown by virtual lines. FIG. 10B is a horizontal cross-sectional view of the collision energy absorbing device 410. As shown in FIGS. 10A and 10B, in the collision energy absorbing device 410 of Embodiment 5, missing portions M41a to M41d are holes formed on a vertical partition plate 415, and missing portions M42a to M42e are holes formed on a horizontal partition plate 416. The number of missing portions M41a to M41d of the vertical partition plate 415 is smaller than the number of missing portions M42a to M42e of the horizontal partition plate 416. The missing portions M41a to M41d of the vertical partition plate 415 are formed such that hole areas thereof gradually decrease from the front side to the rear side, and the missing portions M42a to M42e of the horizontal partition plate 416 are formed such that hole areas thereof gradually decrease from the front side to the rear side. The missing portions M41a to 41d are arranged so as to be symmetrical with respect to the virtual horizontal surface including the axis AX and also symmetrical with respect to the virtual vertical surface including the axis AX, and the missing portions M42a to M42e are arranged so as to be symmetrical with respect to the virtual horizontal surface including the axis AX and also symmetrical with respect to the virtual vertical surface including the axis AX.

The missing portions M41a to 41d and M42a to M42e are provided at positions away from the axis AX. Positions of the missing portions M41a to 41d of the vertical partition plate 415 and positions of the missing portions M42a to M42e of the horizontal partition plate 416 are displaced from each other in the direction along the axis AX. A total of areas of the missing portions M41a to 41d of the vertical partition plate 415 is smaller than a total of areas of the missing portions M42a to M42e of the horizontal partition plate 416. A car longitudinal direction length of the entire missing portions M41a to 41d of the vertical partition plate 415 and a car longitudinal direction length of the entire missing portions M42a to M42e if the horizontal partition plate 416 are different from each other. According to this configuration, by adjusting, for example, a distribution of the hole-shaped missing portions M41a to 41d and M42a to M42e at the time of design, a required load characteristic can be easily realized.

Embodiment 6

Figure 11A:
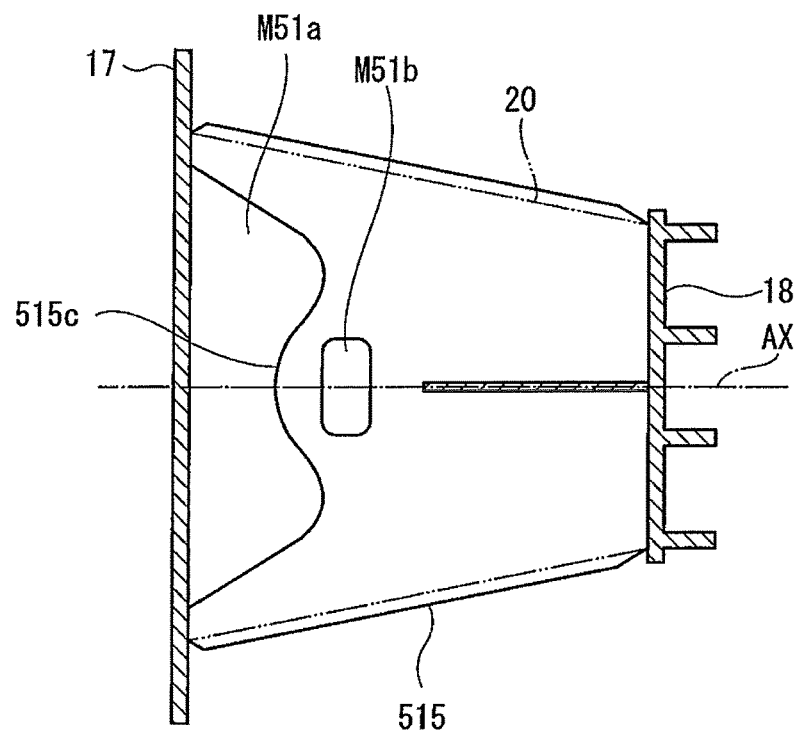
FIG. 11A is a vertical cross-sectional view of the collision energy absorbing device according to Embodiment 6 and is a diagram in which the outer tube is shown by virtual lines.
Figure 11B:
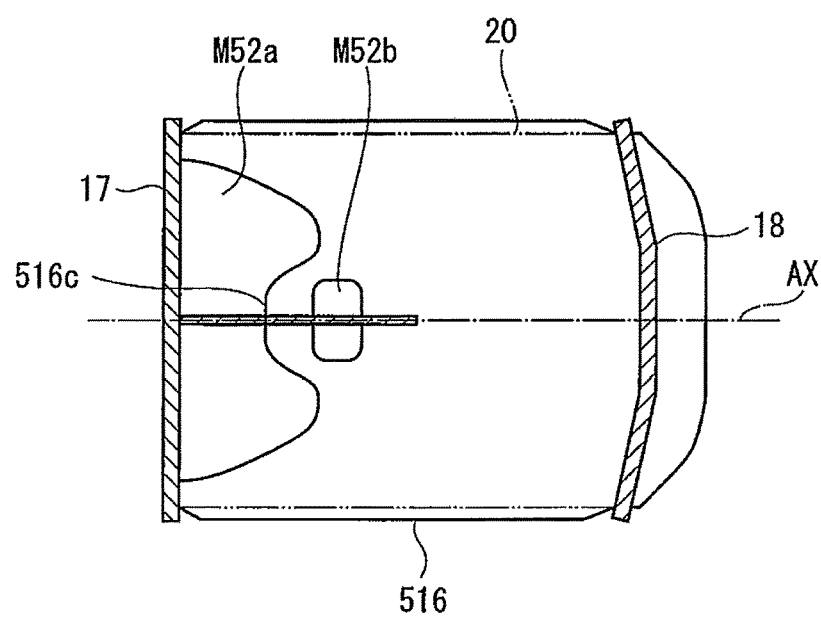
FIG. 11B is a horizontal cross-sectional view of the collision energy absorbing device according to Embodiment 6.

FIG. 11A is a vertical cross-sectional view of a collision energy absorbing device 510 according to Embodiment 6 and is a diagram in which the outer tube 20 is shown by virtual lines. FIG. 11B is a horizontal cross-sectional view of the collision energy absorbing device 510. As shown in FIGS. 11A and 11B, in the collision energy absorbing device 510 of Embodiment 6, a missing portion M51a is provided at a rear side of a vertical partition plate 515, and a missing portion M51b is formed as a hole on the vertical partition plate 515. In addition, a missing portion M52a is provided at a rear side of a horizontal partition plate 516, and a missing portion M52b is formed as a hole on the horizontal partition plate 516. The missing portion M51a is formed by cutting out a rear portion of the vertical partition plate 515 such that a rear end of the vertical partition plate 515 has a W shape, and the missing portion M52a is formed by cutting out a rear portion of the horizontal partition plate 516 such that a rear end of the horizontal partition plate 516 has a W shape.

The missing portion M51b overlaps the axis AX and is arranged behind a center of the vertical partition plate 515 in the direction along the axis AX, and the missing portion M52b overlaps the axis AX and is arranged behind a center of the horizontal partition plate 516 in the direction along the axis AX. To be specific, the hole-shaped missing portion M51b is arranged close to a middle convex portion 515c of the vertical partition plate 515, and the hole-shaped missing portion M52b is arranged close to a middle convex portion 516c of the horizontal partition plate 516. According to this configuration, by adjusting the positions of the hole-shaped missing portions M51b and M52b relative to the missing portions M51a and M52a at the time of design, a required load characteristic can be easily realized.

The present invention is not limited to the above embodiments, and modifications, additions, and eliminations of components thereof may be made. The above embodiments may be combined arbitrarily. A part of components in one embodiment may be applied to another embodiment. For example, the configuration of the vertical partition plate and the configuration of the horizontal partition plate in each of the above embodiments may be replaced with each other. The outer shape of the outer tube may have a shape that is symmetrical with respect to a virtual horizontal surface and a virtual vertical surface, and a drain hole may be formed on a bottom wall of the outer tube. A rear end of the outer tube may have a horizontally long shape, and a front end of the outer tube may have a vertically long shape. In each of the embodiments, the number of vertical partition plates is one, and the number of horizontal partition plates is one. However, the number of vertical partition plates and the number of horizontal partition plates are not limited to these, and at least one of the number of vertical partition plates and the number of horizontal partition plates may be two or more.

REFERENCE SIGNS LIST 1 railcar
10, 110, 210, 310, 410, 510 collision energy absorbing device
11 to 14, 111 to 114 outside plate
15, 215, 315, 415, 515 vertical partition plate
15c, 215c, 515c middle convex portion
15d concave portion
16, 116, 216, 316, 416, 516 horizontal partition plate
16c, 116c, 516c middle convex portion
16d concave portion
17 rear plate
18 front plate
20, 120 outer tube AX axis
H virtual horizontal surface
M1, M2, M12, M21, M22, M31, M32, M41a to 41d and M42a to M42e, M51a, M51b, M52a, M52b missing portion
S internal space
V virtual vertical surface

The invention claimed is:

1. A collision energy absorbing device of a railcar, the collision energy absorbing device comprising:
a plurality of outside plates forming an outer tube having an axis extending in a car longitudinal direction; and
at least one partition plate extending in the car longitudinal direction in an internal space surrounded by the plurality of outside plates, the at least one partition plate being fixed to the plurality of outside plates and dividing the internal space, wherein:
an outer shape of the outer tube is symmetrical with respect to a virtual horizontal surface including the axis, and
the at least one partition plate includes a cutout portion located in the internal space, the cutout portion extending on each side of the axis of the outer tube and having a shape that changes as the cutout portion extends along a perpendicular direction of the at least one partition plate, which is perpendicular to the axis of the outer tube.

2. The collision energy absorbing device according to claim 1, wherein the shape of the cutout portion has an area of a cross section of the partition plate that increases and decreases as the cross section of the partition plate extends from a front side to a rear side.

3. The collision energy absorbing device according to claim 1, wherein the shape of the cutout portion is symmetrical with respect to the virtual horizontal surface including the axis or a virtual vertical surface including the axis.

4. The collision energy absorbing device according to claim 1, further comprising:
a front plate facing a front end of the outer tube; and
a rear plate facing a rear end of the outer tube, wherein the front plate closes an opening of the front end of the outer tube, and the rear plate closes an opening of the rear end of the outer tube.

5. The collision energy absorbing device according to claim 1, further comprising a front plate facing a front end of the outer tube, wherein
the front plate has a shape in a car width direction middle portion of the front plate that projects forward beyond both car width direction end portions of the front plate.

6. The collision energy absorbing device according to claim 1, wherein:
the at least one partition plate includes a vertical partition plate and a horizontal partition plate intersecting with the vertical partition plate;
the cutout portion of at least one of the vertical partition plate and the horizontal partition plate is formed at a car longitudinal direction end portion of the at least one partition plate;
the car longitudinal direction end portion includes a concave portion depressed in the car longitudinal direction and a convex portion projecting in the car longitudinal direction; and
the convex portion is arranged at a position where the vertical partition plate and the horizontal partition plate intersect with each other.

7. The collision energy absorbing device according to claim 1, wherein a vertical length of a rear end of the outer tube is longer than a horizontal length of the rear end of the outer tube, and a vertical length of a front end of the outer tube is shorter than a horizontal length of the front end of the outer tube.

8. The collision energy absorbing device according to claim 2, wherein the shape of the cutout portion is symmetrical with respect to the virtual horizontal surface including the axis or a virtual vertical surface including the axis.

9. The collision energy absorbing device according to claim 2, further comprising:
a front plate facing a front end of the outer tube; and
a rear plate facing a rear end of the outer tube, wherein the front plate closes an opening of the front end of the outer tube, and the rear plate closes an opening of the rear end of the outer tube.

10. The collision energy absorbing device according to claim 3, further comprising:
a front plate facing a front end of the outer tube; and
a rear plate facing a rear end of the outer tube, wherein the front plate closes an opening of the front end of the outer tube, and the rear plate closes an opening of the rear end of the outer tube.

11. The collision energy absorbing device according to claim 2, further comprising a front plate facing a front end of the outer tube, wherein
the front plate has a shape such that a car width direction middle portion of the front plate projects forward beyond both car width direction end portions of the front plate.

12. The collision energy absorbing device according to claim 3, further comprising a front plate facing a front end of the outer tube, wherein
the front plate has a shape such that a car width direction middle portion of the front plate projects forward beyond both car width direction end portions of the front plate.

13. The collision energy absorbing device according to claim 2, wherein:
the at least one partition plate includes a vertical partition plate and a horizontal partition plate intersecting with the vertical partition plate;
the cutout portion of at least one of the vertical partition plate and the horizontal partition plate is formed at a car longitudinal direction end portion of the at least one partition plate;
the car longitudinal direction end portion includes a concave portion depressed in the car longitudinal direction and a convex portion projecting in the car longitudinal direction; and
the convex portion is arranged at a position where the vertical partition plate and the horizontal partition plate intersect with each other.

14. The collision energy absorbing device according to claim 3, wherein:
the at least one partition plate includes a vertical partition plate and a horizontal partition plate intersecting with the vertical partition plate;
the cutout portion of at least one of the vertical partition plate and the horizontal partition plate is formed at a car longitudinal direction end portion of the at least one partition plate;
the car longitudinal direction end portion includes a concave portion depressed in the car longitudinal direction and a convex portion projecting in the car longitudinal direction; and
the convex portion is arranged at a position where the vertical partition plate and the horizontal partition plate intersect with each other.

15. The collision energy absorbing device according to claim 4, wherein:
the at least one partition plate includes a vertical partition plate and a horizontal partition plate intersecting with the vertical partition plate;
the cutout portion of at least one of the vertical partition plate and the horizontal partition plate is formed at a car longitudinal direction end portion of the at least one partition plate;
the car longitudinal direction end portion includes a concave portion depressed in the car longitudinal direction and a convex portion projecting in the car longitudinal direction; and the convex portion is arranged at a position where the vertical partition plate and the horizontal partition plate intersect with each other.

16. The collision energy absorbing device according to claim 2, wherein a vertical length of a rear end of the outer tube is longer than a horizontal length of the rear end of the outer tube, and a vertical length of a front end of the outer tube is shorter than a horizontal length of the front end of the outer tube.

17. The collision energy absorbing device according to claim 3, wherein a vertical length of a rear end of the outer tube is longer than a horizontal length of the rear end of the outer tube, and a vertical length of a front end of the outer tube is shorter than a horizontal length of the front end of the outer tube.

18. The collision energy absorbing device according to claim 4, wherein a vertical length of a rear end of the outer tube is longer than a horizontal length of the rear end of the outer tube, and a vertical length of a front end of the outer tube is shorter than a horizontal length of the front end of the outer tube.

19. The collision energy absorbing device according to claim 5, wherein a vertical length of a rear end of the outer tube is longer than a horizontal length of the rear end of the outer tube, and a vertical length of a front end of the outer tube is shorter than a horizontal length of the front end of the outer tube.

20. The collision energy absorbing device according to claim 6, wherein a vertical length of a rear end of the outer tube is longer than a horizontal length of the rear end of the outer tube, and a vertical length of a front end of the outer tube is shorter than a horizontal length of the front end of the outer tube.

* * * * *